(12) United States Patent
Kawazu

(10) Patent No.: US 10,608,575 B2
(45) Date of Patent: Mar. 31, 2020

(54) ABNORMALITY DIAGNOSIS APPARATUS

(71) Applicant: DENSO CORPORATION, Kariya, Aichi-pref. (JP)

(72) Inventor: Shinsuke Kawazu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/324,799

(22) PCT Filed: Aug. 3, 2017

(86) PCT No.: PCT/JP2017/028264
§ 371 (c)(1),
(2) Date: Feb. 11, 2019

(87) PCT Pub. No.: WO2018/030276
PCT Pub. Date: Feb. 15, 2018

(65) Prior Publication Data
US 2019/0173412 A1 Jun. 6, 2019

(30) Foreign Application Priority Data
Aug. 10, 2016 (JP) ................................. 2016-157554

(51) Int. Cl.
*H02P 29/032* (2016.01)
*H02P 29/024* (2016.01)
*B60R 16/02* (2006.01)

(52) U.S. Cl.
CPC ............ *H02P 29/032* (2016.02); *B60R 16/02* (2013.01); *H02P 29/0241* (2016.02)

(58) Field of Classification Search
CPC ..... H02P 29/032; H02P 29/0241; B60R 16/02

USPC ......................................................... 318/490
See application file for complete search history.

(56) References Cited

U.S. PATENT DOCUMENTS

| 7,457,089 B2 * | 11/2008 | Ohshima ................... H02H 3/00 361/86 |
| 10,078,104 B2 * | 9/2018 | Sekine .................... G01R 31/40 |
| 2009/0026993 A1 * | 1/2009 | Nishibe ................... H02P 31/00 318/490 |
| 2009/0302788 A1 | 12/2009 | Mitsuda et al. |

(Continued)

FOREIGN PATENT DOCUMENTS

| JP | H11-69865 A | 3/1999 |
| JP | 4675299 B2 | 4/2011 |

*Primary Examiner* — Kawing Chan
(74) *Attorney, Agent, or Firm* — Oliff PLC

(57) ABSTRACT

An abnormality diagnosis apparatus performs an abnormality diagnosis of a system equipped with a rotary electric machine (21). The abnormality diagnosis apparatus includes: an abnormality detection section that detects an abnormality of the system; a fail-safe processing section that, when the abnormality detection section detects an abnormality, performs a fail-safe process for controlling the rotary electric machine on a safe side; an abnormality signal generation section that, when the system is in a normal state, generates a false abnormality signal assuming that an abnormality that requires the fail-safe process has occurred; and an operation check section that performs, on the basis of the false abnormality signal generated by the abnormality signal generation section, an operation check for checking whether the fail-safe process operates normally.

8 Claims, 6 Drawing Sheets

(56) References Cited

U.S. PATENT DOCUMENTS

| | | | |
|---|---|---|---|
| 2011/0173497 A1* | 7/2011 | Nakatani | G06F 11/263 714/32 |
| 2013/0193894 A1 | 8/2013 | Kiguchi et al. | |
| 2013/0307448 A1 | 11/2013 | Ikemoto et al. | |
| 2015/0046115 A1 | 2/2015 | Shimono et al. | |
| 2016/0028344 A1* | 1/2016 | Kusakawa | H02P 29/02 318/139 |
| 2016/0341776 A1* | 11/2016 | Sekine | G01R 31/00 |

* cited by examiner

ABNORMALITY DIAGNOSIS APPARATUS

CROSS-REFERENCE TO RELATED APPLICATIONS

The present application is based on Japanese Patent Application No. 2016-157554 filed on Aug. 10, 2016, the description of which is incorporated herein by reference.

TECHNICAL FIELD

The present disclosure relates to an abnormality diagnosis apparatus, and specifically, relates to an abnormality diagnosis apparatus for performing an abnormality diagnosis of a system including a rotary electric machine.

BACKGROUND ART

Conventionally, in a system including a rotary electric machine, an abnormal state such as an abnormality in voltage is detected and a fail-safe function is operated to control the rotary electric machine to be on a safe side (see, for example, Patent Literature 1). Patent Literature 1 discloses that when it is determined that an output circuit of the rotary electric machine is in an overvoltage state, the rotary electric machine is caused to be in a phase short-circuit state by controlling an electric power conversion device, so that a short-circuit current flows through the rotary electric machine. Thus, even when a sudden rise in voltage occurs in a charging path of a control circuit during operation of the rotary electric machine as a power generator, the overvoltage is suppressed and the voltage is also promptly reduced to prevent breakage or the like of circuit elements and devices.

CITATION LIST

Patent Literature

[PTL 1] JP 4675299 B

SUMMARY OF THE INVENTION

Even in a situation where a fail-safe function of the rotary electric machine is not operating normally, as long as the system is operating normally, the main function may not be affected. This can cause a user to fail to notice that the fail-safe function of the rotary electric machine is not operating normally. If the vehicle is continuously used while the fail-safe function of the rotary electric machine is out of order, however, no measures can be taken when an abnormality occurs in the system. This may result in a failure to protect the rotary electric machine.

For example, in the system described in Patent Literature 1, when an abnormality occurs in an overvoltage determination section, a fail-safe function is not operating normally. However, while a power generation function and a power running function, which are main functions, are operating normally, a user fails to notice the abnormality in the fail-safe function. Then, if a vehicle is continuously used without correcting the abnormality in the fail-safe function, and an overvoltage actually occurs, for example, when vibration of the vehicle or the like causes disconnection of a connector connecting a control unit and a DC power supply, the control that causes the rotary electric machine to be put in a phase short-circuit state does not operate, and thus, damage or the like to the circuit elements and the devices by the overvoltage may be unavoidable.

The present disclosure has been made in light of the above problem, and has an object of providing an abnormality diagnosis apparatus capable of determining, before an abnormality occurs, that a fail-safe process for controlling a rotary electric machine on a safe side operates normally when an abnormality occurs.

Means to solve the above problem and effects thereof will be described below.

According to a first aspect of the present disclosure, an abnormality diagnosis apparatus for performing an abnormality diagnosis of a system equipped with a rotary electric machine includes: an abnormality detection section that detects an abnormality of the system; a fail-safe processing section that, when the abnormality detection section detects an abnormality, performs a fail-safe process for controlling the rotary electric machine on a safe side; an abnormality signal generation section that, when the system is in a normal state, generates a false abnormality signal assuming that an abnormality that requires the fail-safe process has occurred; and an operation check section that performs, on the basis of the false abnormality signal generated by the abnormality signal generation section, an operation check for checking whether the fail-safe process operates normally.

According to the above configuration, when the system is in a normal state, a false abnormality signal is generated assuming that an abnormality that requires the fail-safe process has occurred, and on the basis of the false abnormality signal, the operation check is performed for checking whether a fail-safe function for controlling the rotary electric machine on a safe side operates normally. Specifically, when the system is in a normal state, the system is virtually recognized to be in an abnormal state, and due to the virtual abnormal state, the operation check is performed for checking whether the fail-safe function operates normally. This configuration makes it possible to determine, before an abnormality occurs, whether the fail-safe function for controlling the rotary electric machine on a safe side operates. Furthermore, by determining, before an abnormality occurs, whether the fail-safe function can operate, control can be performed, before an abnormality occurs, according to whether the fail-safe function operates. Thus, the rotary electric machine can be properly protected.

According to a second aspect of the present disclosure, while operation of the rotary electric machine is stopped, the operation check section performs the operation check on the basis of the false abnormality signal. This configuration makes it possible to check the operation of the fail-safe function when an abnormality is detected, without inhibiting general functions, i.e., generation of electric power and power running, of the rotary electric machine.

According to a third aspect of the present disclosure, the abnormality diagnosis apparatus further includes a switching circuit, wherein the fail-safe processing section performs the fail-safe process on the basis of a result of comparison between a voltage of a power storage section connected to the rotary electric machine and a threshold voltage, the switching circuit switches a voltage to be compared with the threshold voltage from the voltage of the power storage section to a voltage lower or higher than the threshold voltage, and the abnormality signal generation section generates the false abnormality signal by causing the switching circuit to switch the voltage to be compared with the threshold voltage from the voltage of the power storage section to a voltage lower or higher than the threshold voltage.

This configuration enables the rotary electric machine to virtually have an abnormal power supply voltage value, and this makes it possible to also check whether the comparison process with the threshold voltage operates normally. Specifically, it is possible to check in a series of processes whether an abnormality detection function of detecting an abnormality of the system and the fail-safe function for controlling the rotary electric machine on a safe side when an abnormality is detected by the abnormality detection function operate normally.

According to a fourth aspect of the present disclosure, the abnormality signal generation section generates, as the false abnormality signal, an abnormality signal containing abnormality information different from an actual result of detection performed by the abnormality detection section. This configuration makes it possible to check, on the basis of the abnormality signal containing abnormality information actually generated when the system is in an abnormal state, whether the fail-safe function for controlling the rotary electric machine on a safe side operates normally.

According to a fifth aspect of the present disclosure, the operation check section performs the operation check by controlling an electric current so that no torque is generated by the rotary electric machine. In this case, it is possible to check the operation of the fail-safe function for controlling the rotary electric machine on a safe side, while preventing torque from being generated by the rotary electric machine. Thus, inconvenience due to occurrence of unintended system behavior can be avoided.

According to a sixth aspect of the present disclosure, when the operation check section determines that the fail-safe process does not operate normally, power supply to the rotary electric machine is interrupted. In this case, it is possible to avoid a situation where, even though an abnormality has occurred, the fail-safe function of the rotary electric machine does not operate normally, whereby the rotary electric machine cannot be properly protected.

According to a seventh aspect of the present disclosure, the abnormality diagnosis apparatus further includes: a first power storage section and a second power storage section that are connected in parallel to the rotary electric machine; a first switch that is provided in an electrical path between the first power storage section and the rotary electric machine and electrically connects or disconnects the first power storage section and the rotary electric machine; and a second switch that is provided in an electrical path between the second power storage section and the rotary electric machine and electrically connects or disconnects the second power storage section and the rotary electric machine, wherein while the operation check section is performing an operation check of the fail-safe process, electric power is supplied from the first power storage section to an electrical load that is driven during the operation check, and the operation check section performs the operation check while the first power storage section is electrically disconnected from the rotary electric machine by opening the first switch, and the second power storage section is electrically connected to the rotary electric machine by closing the second switch.

With this configuration, during the operation check of the fail-safe function, the second power storage section and the rotary electric machine are disconnected from the first power storage section, and electric power is supplied from the second power storage section to the rotary electric machine.

In this case, during the operation check of the fail-safe function, electric power is supplied from the first power storage section to the electrical load that is driven during the operation check, and thus, the load can be stably driven. Furthermore, the operation check of the fail-safe function can also be performed in a stable electric power state. Thus, the operation check process can be properly performed.

According to an eighth aspect of the present disclosure, the abnormality diagnosis apparatus is applied to a system equipped with an electromechanical rotary electric machine unit including the rotary electric machine and a control unit that controls operation of the rotary electric machine. In this case, under a situation where the electromechanical rotary electric machine unit functions normally, it is possible to check in advance, before the fail-safe function for controlling the rotary electric machine of the rotary electric machine unit on a safe side is actually operated, whether the fail-safe function operates normally when an abnormality occurs. Furthermore, according to the configuration in which it is checked, on the basis of a false abnormality signal outputted from the control unit of the rotary electric machine unit, whether the fail-safe function operates, the operation check of the fail-safe function can be performed as promptly as possible.

BRIEF DESCRIPTION OF THE DRAWINGS

The above object and other objects, features, and advantages of the present disclosure will be clearer by the following detailed description with reference to the accompanying drawings, wherein.

DESCRIPTION OF THE EMBODIMENTS

First Embodiment

Figure 1:
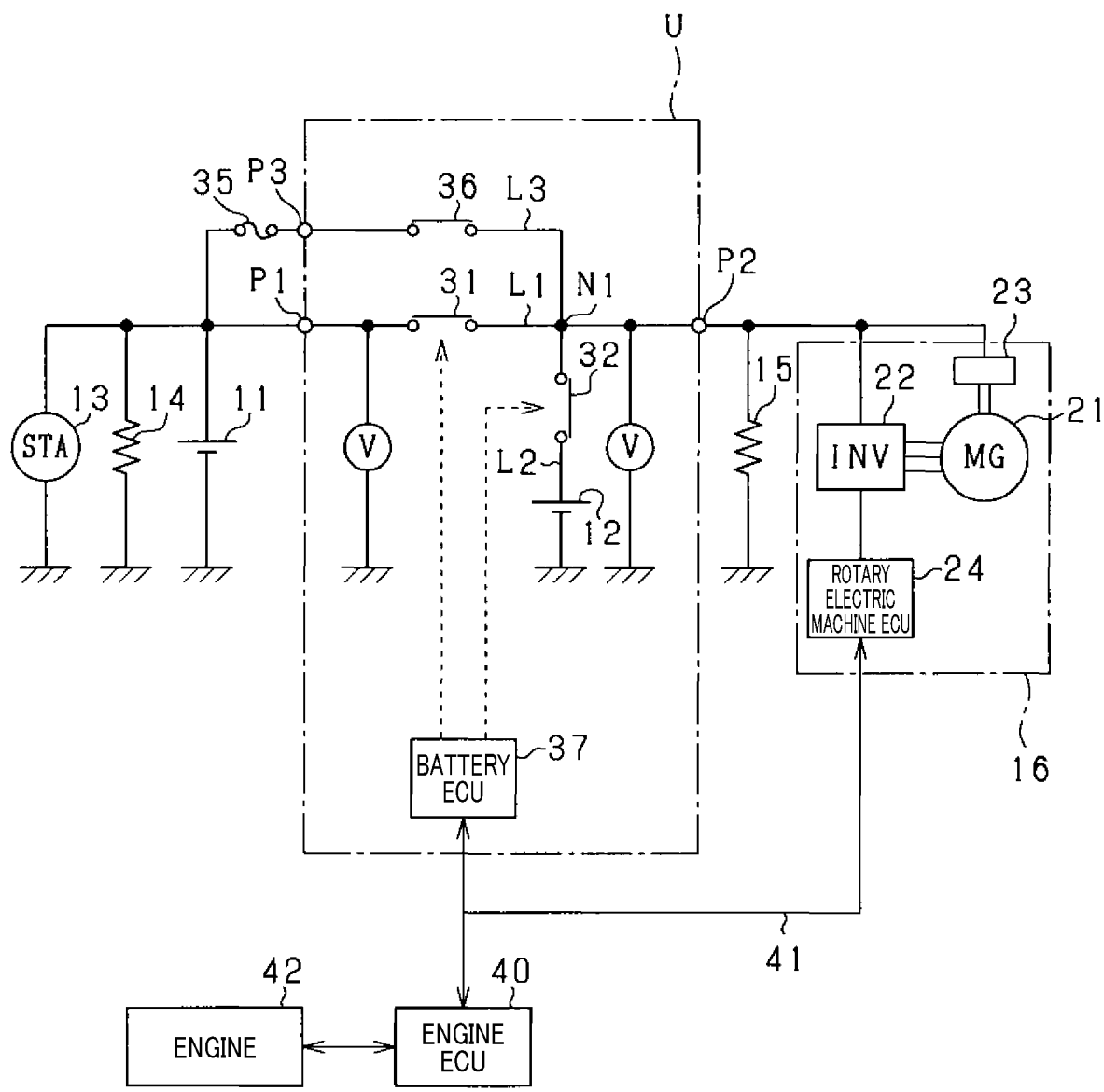
FIG. 1 is an electric circuit diagram illustrating a vehicle system.

A first embodiment will be described below with reference to the drawings. According to the present embodiment, an abnormality diagnosis apparatus that performs an abnormality diagnosis of a vehicle system is embodied. The system supplies electric power to various devices of a vehicle that uses an engine (internal combustion engine) as a drive source to travel. In the following embodiments, the same or equivalent portions are given the same reference numerals in the drawings, and descriptions of the portions given the same reference numerals are incorporated by reference.

As illustrated in FIG. 1, the vehicle system is a dual power supply system including a lead storage battery 11 and a lithium ion storage battery 12 as power storage sections. The storage batteries 11 and 12 can each supply electric power to a starter 13, various electrical loads 14 and 15, and a rotary electric machine unit 16. Furthermore, the storage batteries 11 and 12 can be charged by the rotary electric machine unit 16. In the system, the lead storage battery 11 and the lithium ion storage battery 12 are connected in parallel to each of the rotary electric machine unit 16 and the electrical loads 14 and 15.

The lead storage battery 11 is a well-known general-purpose storage battery. The lithium ion storage battery 12 is a high-density storage battery that loses less electric power in charging and discharging and has a higher output density and a higher energy density than those of the lead storage battery 11. The lithium ion storage battery 12 is preferably a storage battery having higher energy efficiency in charging and discharging than those of the lead storage battery 11. The lithium ion storage battery 12 is constituted as a battery pack including a plurality of single batteries. Rated voltages of the storage batteries 11 and 12 are the same, and are, for example, 12 V.

The lithium ion storage battery 12 is housed in a housing case, and is constituted as a battery unit U integrated with a substrate. The battery unit U includes two output terminals P1 and P2. The lead storage battery 11, the starter 13, and the electrical load 14 are connected to the output terminal P1. The electrical load 15 and the rotary electric machine unit 16 are connected to the output terminal P2.

The electrical loads 14 and 15 require different voltages for electric power supplied from the storage batteries 11 and 12. Specifically, the electrical load 14 includes a constant voltage requiring load that requires the voltage of the supplied electric power to be constant or at least stable so as to vary within a predetermined range. On the other hand, the electrical load 15 is a common electrical load other than the constant voltage requiring load.

Specific examples of the electrical load 14, which is the constant voltage requiring load, include a navigation device, an audio device, a meter device, and various ECUs such as an engine ECU and the like. In this case, when occurrence of fluctuation in voltage of the supplied electric power is suppressed, occurrence of unnecessary reset or the like in the above devices is prevented. This ensures stable operation of the devices. As the electrical load 14, traveling system actuators such as an electric steering device and a brake device may be included. Specific examples of the electrical load 15 include a seat heater, a defroster heater of a rear window, headlights, wipers of a windshield, and an air blowing fan of an air conditioning device.

The rotary electric machine unit 16 includes a rotary electric machine 21, an inverter 22, a field circuit 23, and a rotary electric machine ECU 24 that controls operation of the rotary electric machine 21. The rotary electric machine unit 16 is a power generator with a motor function, and is constituted as an electromechanical ISG (Integrated Starter Generator). Details of the rotary electric machine unit 16 will be described later.

The battery unit U includes, as electrical paths in the unit, an electrical path L1 connecting the output terminal P1 and the output terminal P2 and an electrical path L2 connecting a point N1 on the electrical path L1 and the lithium ion storage battery 12. A switch 31 is provided in the electrical path L1, and a switch 32 is provided in the electrical path L2.

Furthermore, the battery unit U includes a bypass path L3 bypassing the switch 31. The bypass path L3 is provided so as to connect an output terminal P3 and the point N1 on the electrical path L1. The output terminal P3 is connected to the lead storage battery 11 via a fuse 35. The bypass path L3 allows the lead storage battery 11 to be connected to the electrical load 15 and the rotary electric machine unit 16 not via the switch 31. A bypass switch 36 constituted, for example, by a normally closed mechanical relay is provided in the bypass path L3. When the bypass switch 36 is turned on (closed), the lead storage battery 11 is electrically connected to the electrical load 15 and the rotary electric machine unit 16, even if the switch 31 is in an off state (open).

The battery unit U includes a battery ECU 37 that controls an on/off (open/closed) state of each of the switches 31, 32, and 36. The battery ECU 37 is constituted by a microcomputer including a CPU, a ROM, a RAM, an input-output interface, and the like. The battery ECU 37 controls an on/off state of the switches 31, 32, and 36 on the basis of a traveling state of the vehicle and a power storage state of the storage batteries 11 and 12. This enables charge and discharge by selectively using the lead storage battery 11 and the lithium ion storage battery 12. For example, the battery ECU 37 calculates an SOC (State Of Charge) of the lithium ion storage battery 12, and controls the amount of charge and discharge for the lithium ion storage battery 12 so that the SOC is maintained within a predetermined range.

An engine ECU 40 is connected to the rotary electric machine ECU 24 of the rotary electric machine unit 16 and the battery ECU 37 of the battery unit U. The engine ECU 40 is a superior control unit that comprehensively controls the ECUs 23 and 37. The engine ECU 40 is constituted by a microcomputer including a CPU, a ROM, a RAM, an input-output interface, and the like. The engine ECU 40 controls operation of the engine 42 on the basis of an operation state of the engine and a traveling state of the vehicle at each time. By a communication line 41 that forms a communication network such as a CAN, the ECUs 23, 37, and 40 are connected to each other so as to be able to communicate with each other, and bidirectional communication is performed at predetermined time intervals. Thus, various data stored in the ECUs 23, 37, and 40 are shared between each other.

Figure 2:
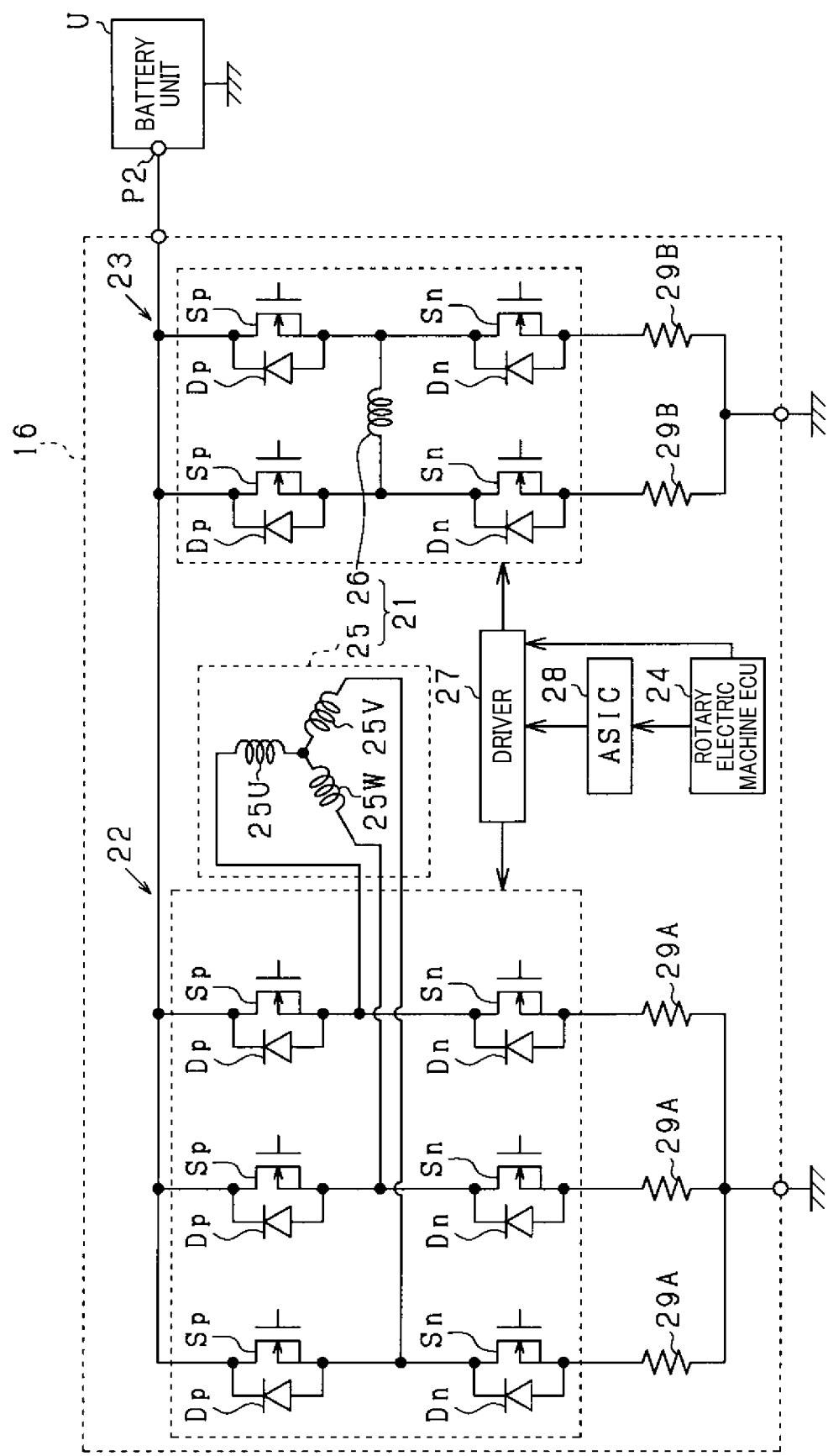
FIG. 2 is a circuit diagram illustrating an electrical configuration of a rotary electric machine unit.

An electrical configuration of the rotary electric machine unit 16 will be described below with reference to FIG. 2. The rotary electric machine 21 is a three-phase AC motor, and includes, as a three-phase armature winding 25, a U-phase winding 25U, a V-phase winding 25V, and a W-phase winding 25W, and a field winding 26. The rotary electric machine unit 16 has a power generation function of generating electric power (regenerative power generation) by rotation of an engine output shaft and a wheel axis, and a power running function of providing torque to the engine output shaft. Specifically, a rotating shaft of the rotary electric machine 21 is coupled to the engine output shaft (not shown) using a belt so as to be driven. Via the belt, when the rotating shaft of the rotary electric machine 21 is rotated by rotation of the engine output shaft, electric power is generated, and when the engine output shaft is rotated by rotation of the rotating shaft of the rotary electric machine 21, torque is provided to the engine output shaft.

The inverter 22 converts an AC voltage outputted from the phase windings 25U, 25V, and 25W into a DC voltage, and outputs the DC voltage to the battery unit U. Furthermore, the inverter 22 converts a DC voltage inputted from the battery unit U into an AC voltage, and outputs the AC voltage to the phase windings 24U, 24V, and 24W. The inverter 22 is a bridge circuit including upper and lower arms, the number of which is the same as the number of phases of the phase windings, and constitutes a three-phase full-wave rectifier circuit. The inverter 22 constitutes a drive circuit that drives the rotary electric machine 21 by adjusting electric power supplied to the rotary electric machine 21.

The inverter 22 includes an upper arm switch Sp and a lower arm switch Sn for each phase. In the present embodiment, as the switches Sp and Sn, voltage-controlled semiconductor switching elements, specifically, N-channel MOSFETs are used. An upper arm diode Dp is connected in antiparallel to the upper arm switch Sp, and a lower arm diode Dn is connected in antiparallel to the lower arm switch Sn. In the present embodiment, body diodes of the switches Sp and Sn are used as the respective diodes Dp and Dn. The diodes Dp and Dn are not limited to the body diodes, but for example, may be diodes of components different from the switches Sp and Sn. An intermediate connection point of the serially connected switches Sp and Sn in each phase is connected to one end of the corresponding one of the phase windings 25U, 25V, and 25W.

The field circuit 23 is a bidirectional switch, and can apply a DC voltage to the field winding 26. In the present embodiment, the field circuit 23 constitutes an H-bridge rectifier circuit in which four switches Sp and Sn are combined. The switches Sp and Sn have the same basic configuration as that of the switches of the inverter 22, and thus are not described here. In the present embodiment, a direction and the amount of a field current flowing through the field winding 26 are controlled by adjusting a DC voltage applied to the field winding 26 through switching control of the switches Sp and Sn.

The switches Sp and Sn constituting the inverter 22 and the field circuit 23 are each independently switched to be driven to be an on/off state via a driver 27. The system includes an electric current detection section 29A that detects phase currents iu, iv, and iw and an electric current detection section 29B that detects a field current if. The electric current detection sections 29A and 29B each include, for example, a current transformer and a resistor.

The rotary electric machine ECU 24 is constituted by a microcomputer including a CPU, a ROM, a RAM, an input-output interface, and the like. The rotary electric machine ECU 24 controls a voltage generated by the rotary electric machine unit 16 (a voltage outputted to the battery unit U) by adjusting a field current to be applied to the field winding 26. Furthermore, after the vehicle starts traveling, the rotary electric machine ECU 24 drives the rotary electric machine 21 by controlling the inverter 22, to assist driving force of the engine. The rotary electric machine 21 can provide initial rotation of a crankshaft when the engine is started, and also has a function as an engine starter.

An abnormality diagnosis process performed in the system will be described below. The system has, as an abnormality diagnosis function, an abnormality detection function of detecting that an abnormality has occurred in the system and a fail-safe function for controlling the rotary electric machine 21 on a safe side when an abnormality has been detected by the abnormality detection process.

Examples of system abnormalities include an abnormality in voltage such as a drop or rise in power supply voltage which is a terminal voltage of the power storage sections (the lead storage battery 11, the lithium ion storage battery 12) connected to the rotary electric machine 21, an on/off failure of the switches in the battery unit U, and an abnormally high temperature of the lithium ion storage battery 12. As a fail-safe process for the occurrence of an abnormality in power supply voltage or an abnormality in the battery unit U, the rotary electric machine unit 16 restricts operation of the rotary electric machine 21. In the present embodiment, as the restriction on the operation of the rotary electric machine 21, a process is performed in which an electric current to the rotary electric machine 21 is interrupted by turning off the switches Sp and Sn of the inverter 22 and the field circuit 23.

Figure 3:
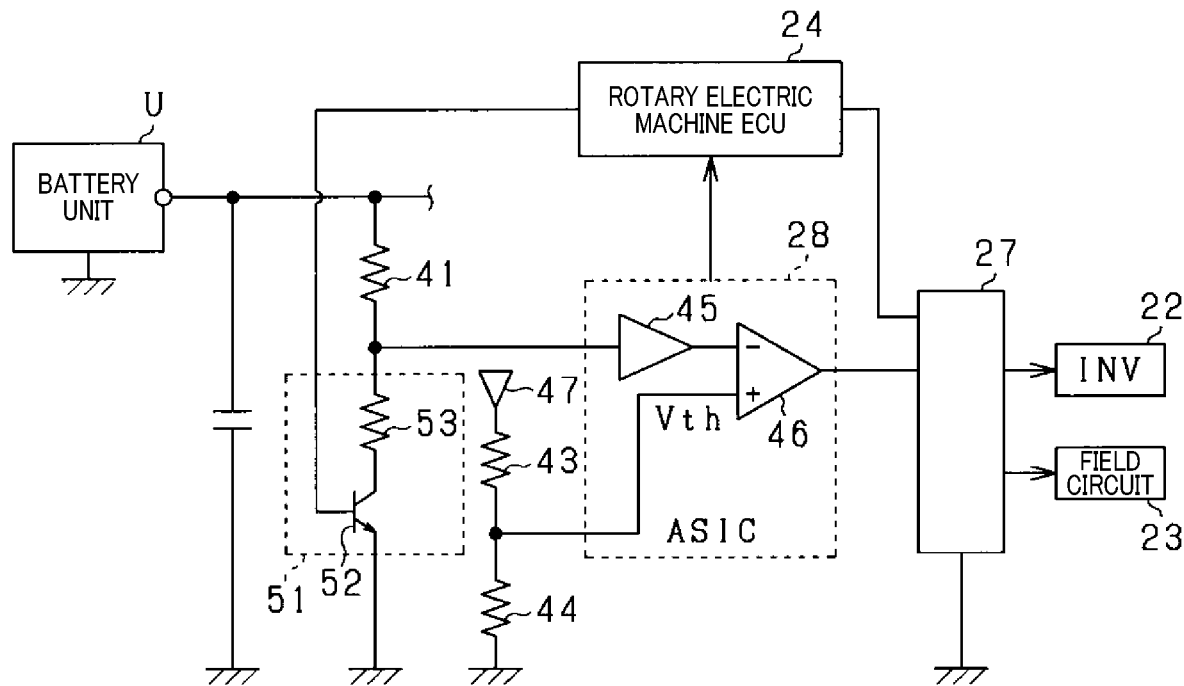
FIG. 3 is a circuit diagram illustrating a part of an electrical configuration of a voltage monitoring section.

An abnormality in power supply voltage is detected by an ASIC 28 included in the rotary electric machine unit 16. FIG. 3 illustrates an electrical configuration of a voltage monitoring section that monitors a drop in power supply voltage. The ASIC 28 includes a comparator 46 as the voltage monitoring section for monitoring whether the power supply voltage is a threshold voltage Vth or more. A voltage of the power supply (the lead storage battery 11, the lithium ion storage battery 12) is applied to one input terminal (an inverted input terminal, in this case) of the comparator 46 via a resistor 41 and a buffer 45. A voltage obtained by dividing a voltage of a power supply 47 is applied to the other input terminal (a non-inverted input terminal, in this case) of the comparator 46.

The power supply 47 is constituted, for example, by a constant voltage circuit, and has a constant voltage of, for example, 5V. Two resistors 43 and 44 are connected in series to the power supply 47, and the resistors 43 and 44 constitute a voltage dividing circuit. An intermediate point voltage of the resistors 43 and 44 is inputted as the threshold voltage Vth to the non-inverted input terminal of the comparator 46. A signal (H or L) corresponding to a result of comparison between the power supply voltage and the threshold voltage Vth is outputted from an output terminal of the comparator 46. A reference voltage is generated when the power supply voltage is stepped down by the resistor 41. Thus, actually, a voltage obtained by stepping down the power supply voltage is applied to the inverted input terminal of the comparator 46.

The output signal of the comparator 46 is inputted into the driver 27. According to the inputted signal, the switches Sp and Sn of the inverter 22 and the field circuit 23 are driven to be an on/off state. Specifically, when the output signal of the comparator 46 is L, it is determined that the power supply voltage is normal. In this case, normal switching control based on a torque command from the superior control unit is performed. On the other hand, when the output signal of the comparator 46 is H, it is determined that a voltage drop abnormality in which a power supply voltage drops has occurred. In this case, the switches Sp and Sn of the inverter 22 and the field circuit 23 are driven to be an off state.

Abnormalities such as a switch failure and an abnormally high temperature in the battery unit U are detected by the battery ECU 37. The battery ECU 37 outputs, via the communication line 41, an abnormality signal indicating occurrence of an abnormality to other ECUs, i.e., the rotary electric machine ECU 24 and the engine ECU 40. On the basis of a result of the detection of an abnormality in voltage performed by the ASIC 28 and the abnormality signal received from the battery ECU 37, the rotary electric machine ECU 24 causes the rotary electric machine 21 to perform fail-safe operation.

Even in a situation where, in the vehicle system, the fail-safe function does not operate normally, as long as the system is operating normally, a main function may not be affected. This can cause a user to fail to notice that the fail-safe function is not operating normally. If the vehicle is continuously used while the fail-safe function is out of order, however, no measures can be taken when a system abnormality occurs. This may result in a failure to protect the rotary electric machine 21.

According to the present embodiment, therefore, when the vehicle system is in a normal state, a false abnormality signal is outputted from the ASIC 28 assuming that an abnormality that requires the fail-safe process has occurred, and on the basis of the false abnormality signal, an operation check is performed for checking whether the fail-safe function operates normally. That is, when the vehicle system is in a normal state, an abnormality that requires the fail-safe process is virtually created, and under the virtual abnormal situation, the operation check is performed for checking whether the fail-safe function operates normally.

Specifically, according to the present embodiment, while operation of the rotary electric machine 21 is stopped, a voltage value lower than that of the threshold voltage Vth is inputted to the inverted input terminal of the comparator 46, so that the ASIC 28 generates a false abnormality signal indicating that a voltage drop abnormality has occurred. Then, the false abnormality signal is outputted from the ASIC 28 to a stator side or a field side. Phase currents and a field current at this point are monitored to check that an electric current to the rotary electric machine 21 is reliably interrupted when the power supply voltage drops. In the present embodiment, a fail-safe processing section 24C and the ASIC 28 constitute a "fail-safe processing section" of the present disclosure, and the rotary electric machine ECU 24 and the ASIC 28 constitute an "abnormality signal generation section".

As a configuration for generating a false abnormality signal, as illustrated in FIG. 3, the rotary electric machine unit 16 includes a voltage switching circuit 51 upstream of the ASIC 28. The voltage switching circuit 51 switches an input voltage of the inverted input terminal of the comparator 46 between a voltage value corresponding to an actual power supply voltage and a voltage value lower than that of the threshold voltage Vth.

Specifically, as illustrated in FIG. 3, the voltage switching circuit 51 includes a switch 52 that is controlled by the rotary electric machine ECU 24 to be in an on/off state. One end of the switch 52 is grounded, and the other end of the switch 52 is connected to the battery unit U via two resistors 53 and 41 arranged in series. The two resistors 41 and 53 constitute a voltage dividing circuit. When the switch 52 is switched from an off state to an on state, an intermediate point voltage Tm of the two resistors 41 and 53 is inputted to the inverted input terminal of the comparator 46. Resistance values of the two resistors 41 and 53 are each determined so that the intermediate point voltage Tm inputted at this point is lower than the threshold voltage Vth.

Figure 4:
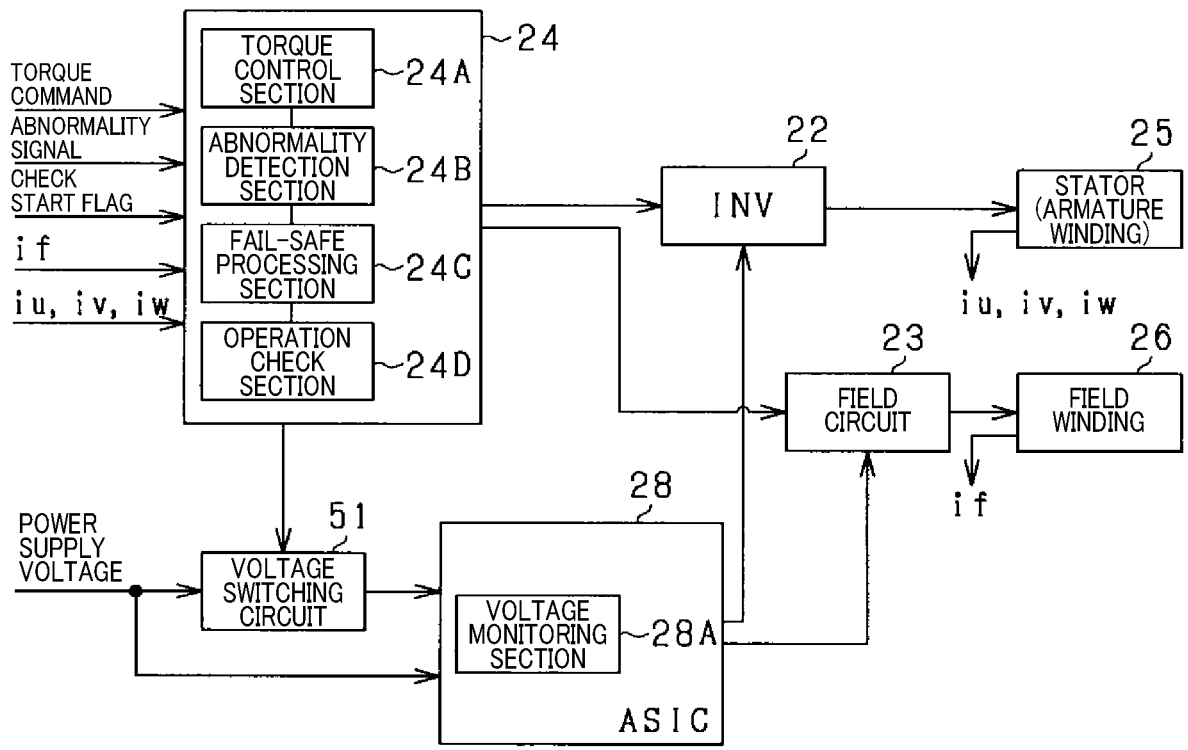
FIG. 4 is a functional block diagram illustrating an operation check process for an abnormality diagnosis function according to a first embodiment.

FIG. 4 is a functional block diagram illustrating an operation check process of checking that the abnormality diagnosis function for an abnormality in voltage operates normally. The rotary electric machine ECU 24 includes a torque control section 24A, an abnormality detection section 24B, the fail-safe processing section 24C, and an operation check section 24D. The torque control section 24A performs switching control of the switches of the inverter 22 and the field circuit 23 on the basis of a torque command received from the engine ECU 40. Thus, the rotary electric machine 21 generates electric power or performs power running.

The abnormality detection section 24B detects an abnormality occurring in the rotary electric machine unit 16, and receives an abnormality signal from another ECU (the battery ECU 37, in the present embodiment). When the fail-safe processing section 24C receives, from the abnormality detection section 24B, an abnormality signal containing information (abnormality information) regarding an abnormality that has occurred in the vehicle system, the fail-safe processing section 24C controls an electric current for the fail-safe process. In the present embodiment, as fail-safe process, electric currents to the stator side and the field side are interrupted.

With regard to the operation check process for the abnormality diagnosis function, the torque control section 24A receives a check start flag as a trigger for performing the operation check process for the abnormality diagnosis function. Then, the torque control section 24A controls an electric current to the rotary electric machine 21 so that an electric current for operation check is applied as a minute electric current for checking that the electric current is interrupted. In the present embodiment, the operation check is separately performed for each of the stator side and the field side. Thus, one of the stator side and the field side is selected as an operation check target, and an electric current for operation check is applied to the selected operation check target. This prevents torque from being generated by the rotary electric machine 21. In the present embodiment, the check start flag is a flag received from the engine ECU 40 when the system is shut down.

When the check start flag is inputted, the operation check section 24D applies an electric current to the operation check target. Then, the operation check section 24D outputs a switching command to the switch 52 of the voltage switching circuit 51 so that the switch 52 is driven to be an on state. Thus, as a voltage to be compared with the threshold voltage Vth, a voltage lower than the threshold voltage Vth is inputted into the voltage monitoring section 28A of the ASIC 28. When the low voltage is inputted, an abnormality signal, i.e., a false abnormality signal for causing a virtual abnormality is outputted from the ASIC 28 to the inverter 22 and the field circuit 23 via the driver 27. When the abnormality signal is outputted, switches of the operation check target are driven to be off states to interrupt an electric current to the rotary electric machine 21. The operation check section 24D checks, on the basis of electric current detection values for the field side and the stator side inputted at this point, whether the switches of the operation check target have actually been turned off, i.e., whether the electric current has been interrupted.

The operation check for the field side is sequentially performed for each phase, but the order of the operation checks is not particularly limited. The electric current for operation check is controlled so that the electric current flows through an electrical path of the operation check target. At the time of the operation check, a switch on the electrical path through which the electric current for operation check has been passed is turned off. Also in the case of the stator side, the operation check is sequentially performed for the U-phase, the V-phase, and the W-phase, but the order of the operation checks is not particularly limited. The electric current for operation check is controlled so that the electric current flows through a phase winding that is the operation check target. At the time of the operation check, a switch connected to the phase winding through which the electric current for operation check has been passed is turned off.

An operation check process for the abnormality diagnosis function for a voltage drop abnormality will be described below with reference to a flow chart in FIG. 5. This process is performed by the rotary electric machine ECU 24 when a check start flag is inputted by the rotary electric machine ECU 24.

Figure 5:
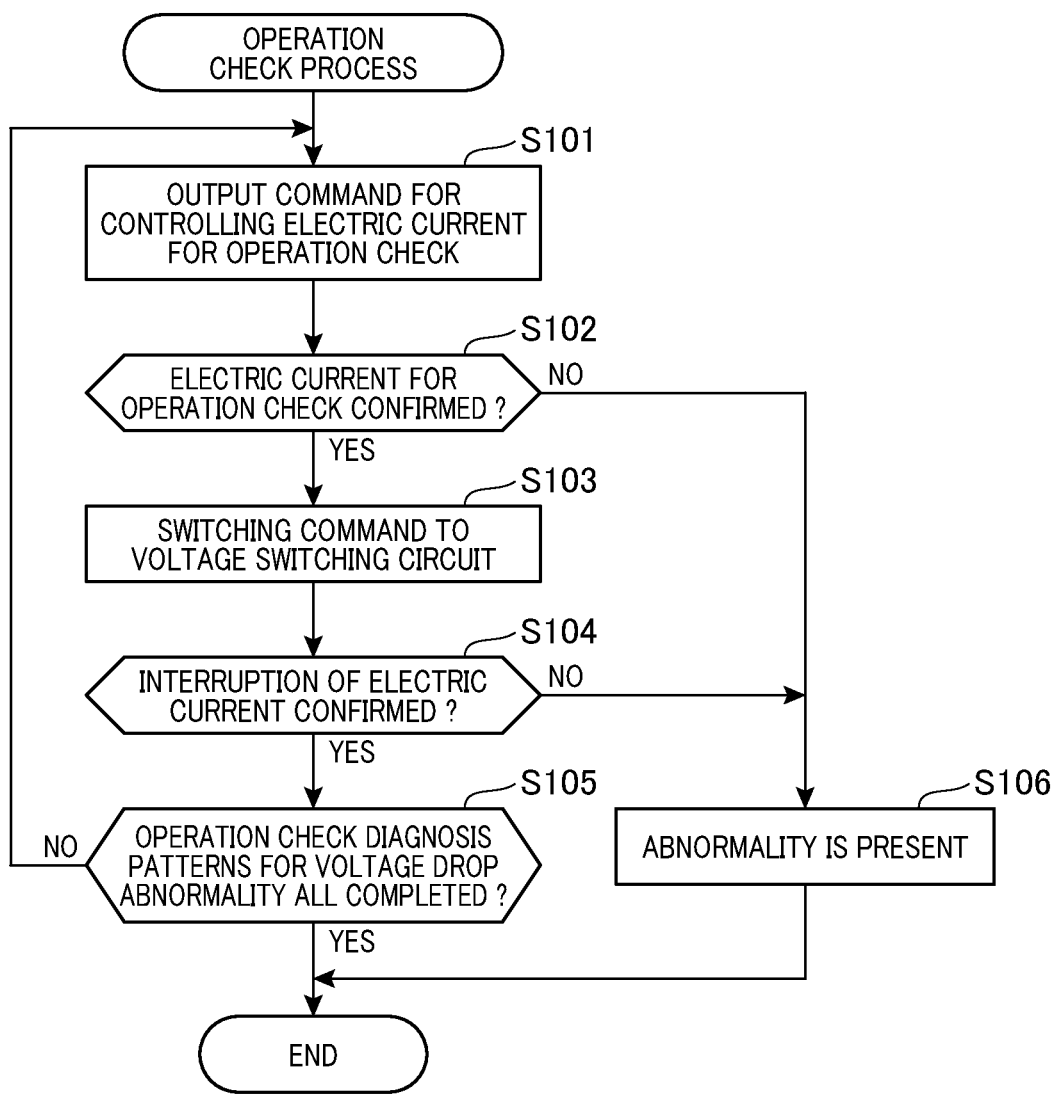
FIG. 5 is a flow chart showing a procedure of an operation check process for an abnormality in voltage.

In FIG. 5, in step S101, a command for controlling an electric current for operation check is outputted. In this step, from the stator side and the field side, the field side is first selected as the operation check target, and an electric current for operation check is applied to the field winding 26. In subsequent step S102, on the basis of an electric current detection value detected by the electric current detection section, it is checked whether the electric current for operation check is flowing. When the electric current detection value is a predetermined value or more, it is determined that the electric current for operation check is flowing, and the present process proceeds to step S103.

In step S103, a switching command is outputted to the voltage switching circuit 51. Thus, the switch 52 is turned on, whereby a false abnormality signal is generated, and the false abnormality signal is outputted from the ASIC 28 to the driver 27. In subsequent step S104, on the basis of an electric current detection value detected by the electric current detection section, it is checked whether the electric current has been interrupted. For example, when the operation check target is the field side, an electric current detection value of the field current if detected by the electric current detection section is compared with a threshold. When the electric current detection value is the threshold or less, it is determined that for the field side, the electric current has been interrupted normally and thus the abnormality diagnosis function operates normally.

Then, the present process proceeds to step S105, and it is determined whether diagnosis patterns for the operation check of the abnormality diagnosis function for a voltage drop abnormality are all completed. When, out of the field side and the stator side, an operation check for the stator side has not been performed, a negative determination is made in step S105, and the processes in steps S101 to S105 are performed again for the stator side. When the operation check of the abnormality diagnosis function is completed for each of the field side and the stator side, an affirmative determination is made in step S105, and the present process ends at this point.

When, even though the electric current for operation check has been passed, no electric current value that is the predetermined value or more has been confirmed, a negative determination is made in step S102. Then, the present process proceeds to step S106, and a signal indicating that an abnormality is present is outputted to the engine ECU 40 and the battery ECU 37.

When, even though the switching command has been outputted to the voltage switching circuit 51, no interruption of the electric current has been confirmed, a negative determination is made in step S104. Then, the present process proceeds to step S106, and it is determined that an abnormality is present in the abnormality diagnosis function. In this case, the rotary electric machine unit 16 interrupts an electric current to the rotary electric machine 21. Instead of interrupting the electric current to the rotary electric machine 21, notification that an abnormality is present may be provided to a driver. Alternatively, both the interruption of the electric current to the rotary electric machine 21 and the notification to the driver may be performed. In addition, a signal indicating that an abnormality has occurred in the abnormality diagnosis function is outputted to the engine ECU 40 and the battery ECU 37. The interruption of the electric current to the rotary electric machine 21 and/or the notification to the driver may be performed on condition that the operation check of the abnormality diagnosis function is performed multiple times, and that it is determined a predetermined number of times or more that an abnormality is present.

The present embodiment described above in detail yields the following beneficial effects.

According to the above configuration, when the system is in a normal state, a false abnormality signal is generated assuming that an abnormality that requires the fail-safe process for controlling the rotary electric machine 21 on a safe side has occurred, and on the basis of the false abnormality signal, the operation check is performed for checking whether the fail-safe function operates normally. This configuration makes it possible to determine in advance, before an abnormality occurs, whether the fail-safe function for controlling the rotary electric machine 21 on a safe side operates. Thus, control can be performed according to whether the fail-safe function operates. Furthermore, the rotary electric machine 21 can be properly protected.

According to the above configuration, while the operation of the rotary electric machine 21 is stopped, the operation check of the fail-safe function is performed on the basis of the false abnormality signal. This makes it possible to check the operation of the fail-safe function when an abnormality is detected, without inhibiting the general functions, i.e., the generation of electric power and power running, of the rotary electric machine 21. In the present embodiment in particular, the operation check process is performed when the system is shut down. This ensures sufficient time for the operation check of the fail-safe function, whereby the operation check process can be reliably completed.

According to the above configuration, the fail-safe process is performed when the power supply voltage is the threshold voltage Vth or less. In this configuration, the voltage switching circuit 51 is provided as the switching circuit that switches a voltage to be compared with the threshold voltage Vth from the power supply voltage to a voltage lower than the threshold voltage Vth. At the time of the operation check of the fail-safe function, the switch 52 of the voltage switching circuit 51 is driven to be an on state, so that a false abnormality signal is outputted. This configuration enables the rotary electric machine 21 to virtually have an abnormal power supply voltage value, and this makes it possible to also check whether the comparison process with the threshold voltage Vth operates normally. Specifically, it is possible to check in a series of processes whether the abnormality detection function of detecting an abnormality of the system and the fail-safe function for controlling the rotary electric machine on a safe side when an abnormality is detected by the abnormality detection function operate normally.

According to the above configuration, the operation check of the fail-safe function of the rotary electric machine 21 is performed by controlling the electric current so that no torque is generated by the rotary electric machine 21. This makes it possible to avoid inconvenience due to occurrence of unintended system behavior, specifically, occurrence of unintended vehicle behavior, deterioration in drivability, or the like.

According to the above configuration, when it is determined by the operation check process that the fail-safe process of the rotary electric machine 21 does not operate normally, power supply to the rotary electric machine 21 is interrupted. This makes it possible to avoid a situation where, even though an abnormality has occurred in the system, the fail-safe function of the rotary electric machine 21 does not operate normally, whereby the rotary electric machine 21 cannot be properly protected.

Second Embodiment

A second embodiment will be described below with particular emphasis on differences from the first embodiment. In the first embodiment, on the basis of the false abnormality signal generated due to the voltage drop abnormality virtually caused by the voltage switching circuit 51, it is checked whether the fail-safe function operates for the voltage drop abnormality. In the present embodiment, in addition to the above configuration, the rotary electric machine ECU 24 generates, as the false abnormality signal, an abnormality signal containing abnormality information different from an actual result of detection performed by the abnormality detection section 24B, and on the basis of the false abnormality signal, it is checked directly by the rotary electric machine ECU 24 or via the ASIC 28 whether the fail-safe function can be operated normally.

Figure 6:
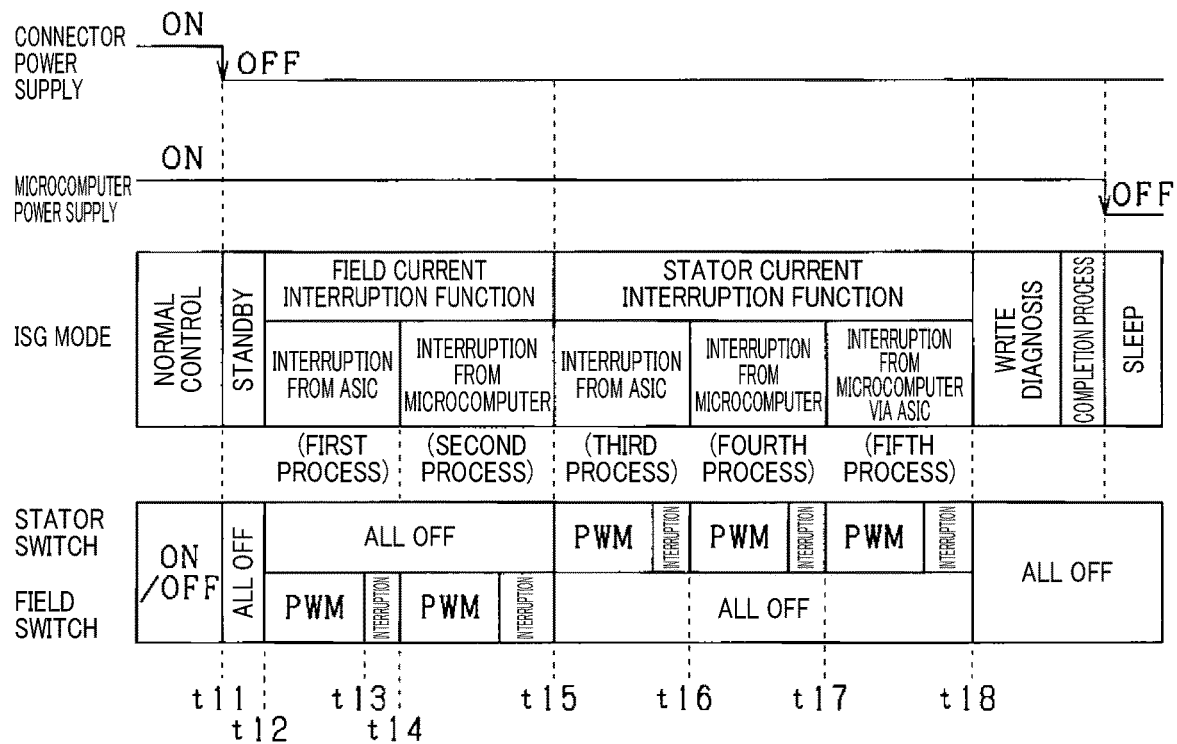
FIG. 6 is a timing diagram showing an operation check process according to a second embodiment.

FIG. 6 is a timing diagram showing an operation check process for the abnormality diagnosis function. This process is performed by the rotary electric machine ECU 24 when the system is shut down.

In FIG. 6, when a connector power supply is switched from an on state to an off state, first, the switches of the inverter 22 and the field circuit 23 are all temporarily turned off (time t11). Then, a field-side check process, which is a process of checking a function of interrupting an electric current to the field side, and a stator-side check process, which is a process of checking a function of interrupting an electric current to the stator side, are performed in this order.

Specifically, after time t12 when a predetermined time period has elapsed from time t11, a first process and a second process are performed as the field-side check process. The first process is a process of checking whether the field current if can be interrupted on the basis of a command from the ASIC 28. The second process is a process of checking whether the field current if can be interrupted on the basis of a command from the rotary electric machine ECU 24.

In the first process, the operation of the fail-safe function is checked by, first, applying a field current if as the electric current for operation check, then turning on the switch 52 of the voltage switching circuit 51, so that a voltage drop abnormality is virtually caused in the system, and monitoring the field current if under the virtual abnormal situation (time t12 to t14). Specifically, it is checked that the electric current has been interrupted when the field current if is applied for a predetermined time period from time t12, and then the fail-safe process operates due to the virtual voltage drop abnormality, and at time t13, all the switches of the field circuit 23 are turned off.

In the second process, it is checked whether a field current if can be interrupted when the field current if is applied as the electric current for operation check, and then an off command for the switches of the field circuit 23 is outputted on the basis of a false abnormality signal generated by the rotary electric machine ECU 24 (time t14 to t15). During the field-side check process, all the switches of the stator side are maintained in off states. The operation check is separately performed for each phase, but the order of the operation checks is not particularly limited. The electric current for operation check is controlled so that the electric current flows through an electrical path of the operation check target. At the time of the operation check, a switch on the electrical path to which the electric current for operation check has been applied is turned off.

When the field-side check process ends, the stator-side check process is subsequently performed. As the stator-side check process, a third process, a fourth process, and a fifth process are performed. The third process is a process of checking whether the phase currents iu, iv, and iw can be interrupted on the basis of a command from the ASIC 28. The fourth process is a process of checking whether the phase currents iu, iv, and iw can be interrupted on the basis of a command from the rotary electric machine ECU 24. The fifth process is a process of checking whether the phase currents iu, iv, and iw can be interrupted on the basis of a command outputted from the rotary electric machine ECU 24 via the ASIC 28.

In the third process, first, after a phase current is applied as the electric current for operation check, the switch 52 of the voltage switching circuit 51 is turned on, whereby a voltage drop abnormality is virtually caused in the system. Then, the operation of the fail-safe function is checked by monitoring the phase current under the virtual abnormal situation (time t15 to t16). In the fourth process, it is checked whether a phase current can be interrupted when the phase current is applied as the electric current for operation check, and then an off command for the switches of the inverter 22 is outputted on the basis of a false abnormality signal generated by the rotary electric machine ECU 24 (time t16 to t17).

In the fifth process, the rotary electric machine ECU 24 applies a phase current as the electric current for operation check. Furthermore, a false abnormality signal generated by the rotary electric machine ECU 24 is outputted to the ASIC 28. The ASIC 28 determines a system abnormality on the basis of the false abnormality signal, and outputs an off command for the switches of the inverter 22. Thus, it is checked whether the phase current can be interrupted (time t17 to t18). During the stator-side check process, the switches of the field side are maintained in off states. The operation check for the stator side is sequentially performed for the U-phase, the V-phase, and the W-phase, but the order of the operation checks is not particularly limited. The electric current for operation check is controlled so that the electric current flows through a phase winding that is the operation check target. At the time of the operation check, a switch connected to the phase winding through to the electric current has been applied is turned off.

Figure 7:
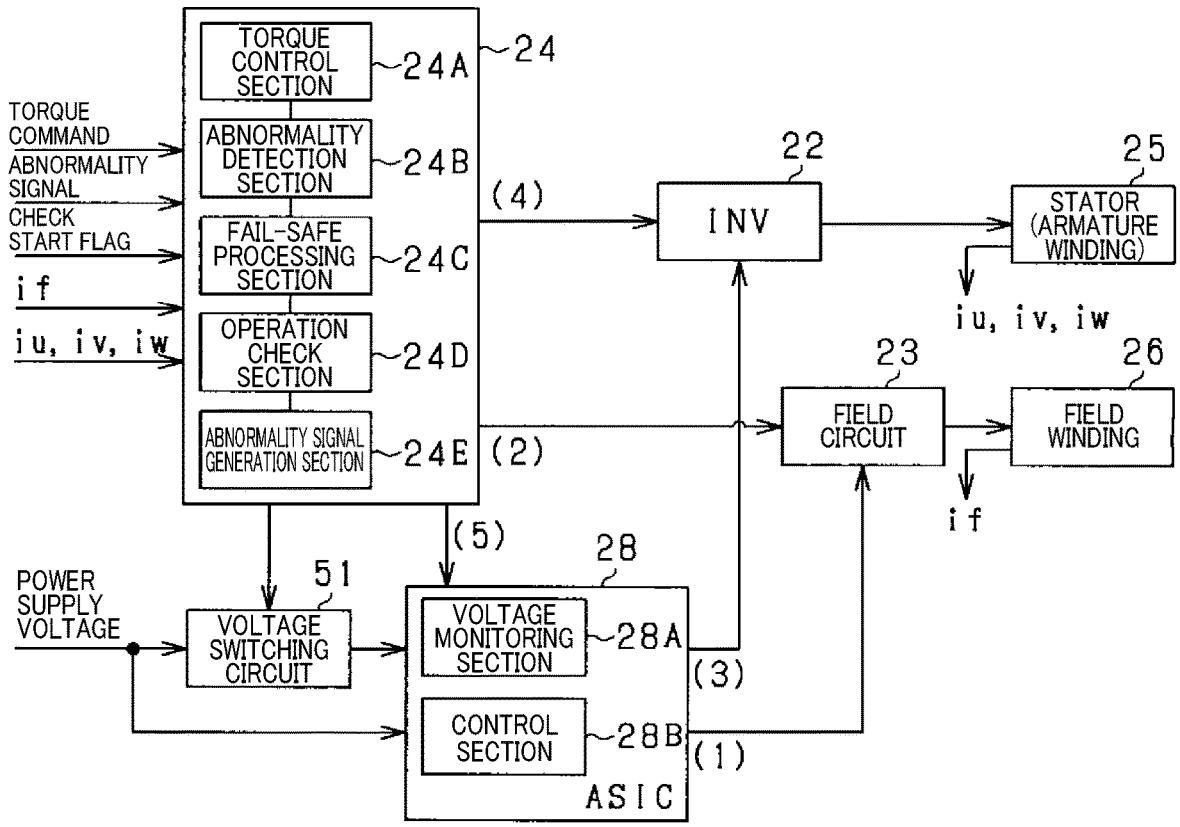
FIG. 7 is a functional block diagram illustrating an operation check process for an abnormality diagnosis function according to the second embodiment.

FIG. 7 is a functional block diagram illustrating an operation check process of checking whether the abnormality diagnosis function operates normally. An operation check of the abnormality diagnosis function for a voltage drop abnormality is the same as that in FIG. 4, and thus is not described here. Numbers in parentheses in FIG. 7 indicate points where a false abnormality signal is outputted in the first to fifth processes, and the numbers correspond to the respective process numbers of the first to fifth processes.

In addition to the torque control section 24A, the abnormality detection section 24B, the fail-safe processing section 24C, and the operation check section 24D, the rotary electric machine ECU 24 further includes an abnormality signal generation section 24E. When receiving an operation start flag, the abnormality signal generation section 24E generates a false abnormality signal, and outputs the false abnormality signal to the fail-safe processing section 24C and the ASIC 28.

The false abnormality signal is generated when the abnormality detection section 24B has detected no abnormality, and the result of the detection is rewritten to indicate that an abnormality is present. This false abnormality signal contains abnormality information on the system, as in an abnormality signal generated when an abnormality actually occurs. Examples of the abnormality information include information regarding abnormalities such as an abnormality in power supply voltage and an abnormality in the battery unit U. Upon receipt of the false abnormality signal from the abnormality signal generation section 24E, on the basis of the reception of the false abnormality signal, the fail-safe processing section 24C controls an electric current for the fail-safe process.

The abnormality detection section 24B may have the function of the abnormality signal generation section 24E. In this case, an output of the result of the detection performed by the abnormality detection section 24B is rewritten from information indicating that "no abnormality is present" to information indicating that "an abnormality is present". Thus, the false abnormality information is outputted from the abnormality detection section 24B to the fail-safe processing section 24C.

In addition to the voltage monitoring section 28A, the ASIC 28 further includes a control section 28B. Upon receipt of the false abnormality signal from the abnormality signal generation section 24E of the rotary electric machine ECU 24, on the basis of the reception of the false abnormality signal, the control section 28B of the ASIC 28 controls an electric current for the fail-safe process. In this case, electric currents to the stator side and the field side are interrupted.

The operation check process of checking the abnormality diagnosis function for an abnormality signal will be described below with reference to a flow chart in FIG. 8. The process in FIG. 8 corresponds to the fifth process. This process is performed by the rotary electric machine ECU 24 at a time when the first to fourth processes end after a check start flag is received by the rotary electric machine ECU 24.

Figure 8:
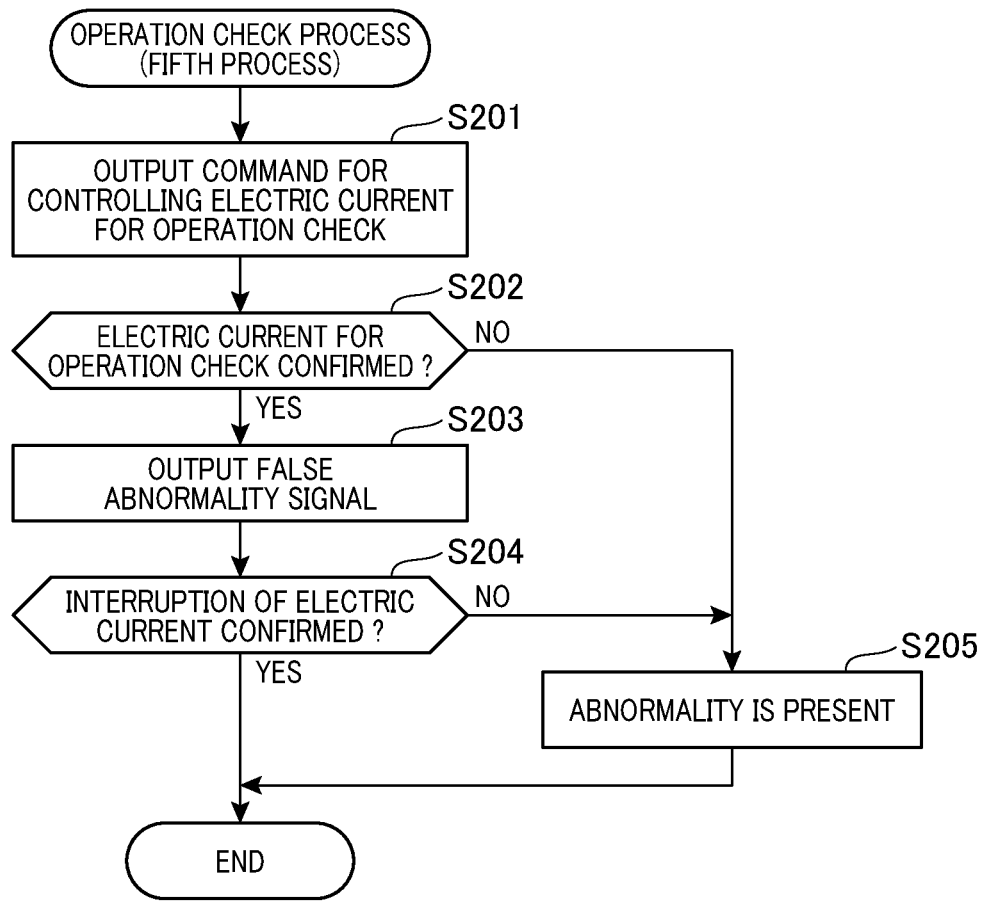
FIG. 8 is a flow chart showing a procedure of an operation check process for an abnormality signal.

In FIG. 8, in step S201, a command for controlling an electric current for operation check of the abnormality diagnosis function is outputted. At this step, the electric current for operation check is applied to the stator side. In subsequent step S202, on the basis of an electric current detection value detected by the electric current detection section, it is checked whether the electric current for operation check is flowing. When the electric current detection value is a predetermined value or more, it is determined that the electric current for operation check is flowing, and the present process proceeds to step S203.

In step S203, a result of detection performed by the abnormality detection section 24B is rewritten to generate a false abnormality signal, and the generated false abnormality signal is outputted to the ASIC 28. In subsequent step S204, on the basis of an electric current detection value detected by the electric current detection section, it is checked whether the electric current has been interrupted. In this step, an electric current detection value of each phase current is compared with a threshold. When the electric current detection value is the threshold or less, it is determined that the electric current has been interrupted normally by the ASIC 28 on the basis of a command from the rotary electric machine ECU 24 and that thus the abnormality diagnosis function operates normally.

When, even though the electric current for operation check has been applied, no electric current value that is the predetermined value or more has been confirmed, a negative determination is made in step S202, and then the present process proceeds to step S205. In step S205, a signal indicating that an abnormality has occurred in the system is outputted to the engine ECU 40 and the battery ECU 37.

When no interruption of the voltage has been confirmed after the false abnormality signal has been outputted, a negative determination is made at step S204. Then, the present process proceeds to step S205, and it is determined that an abnormality is present in the abnormality diagnosis function. In this case, the rotary electric machine unit 16 interrupts an electric current to the rotary electric machine 21, notifies the driver that an abnormality is present, or performs both the interruption of the electric current to the rotary electric machine 21 and the notification to the driver. In addition, a signal indicating that an abnormality has occurred in the abnormality diagnosis function is outputted to the engine ECU 40 and the battery ECU 37.

According to the present embodiment described above in detail, the abnormality signal generation section 24E of the rotary electric machine ECU 24 generates, as the false abnormality signal, an abnormality signal containing abnormality information different from the actual result of the detection performed by the abnormality detection section 24B, and performs the operation check of the fail-safe function on the basis of the false abnormality signal. Thus, it is possible to check, on the basis of the abnormality signal containing abnormality information actually generated when the system is in an abnormal state, whether the fail-safe function for controlling the rotary electric machine on a safe side operates normally.

Other Embodiments

The present disclosure is not limited to the above embodiments, but may be modified, for examples, as described below.

In the above embodiments, the drop in power supply voltage has been described as the abnormality in power supply voltage virtually caused in the ASIC 28. However, a rise in power supply voltage may be virtually caused in the ASIC 28, and in a situation where the virtual abnormality has occurred, it may be checked, on the basis of an electric current value detected by the electric current detection section 29, whether the fail-safe function operates normally. A configuration for virtually causing a rise in power supply voltage in the ASIC 28 is not particularly limited. For example, the ASIC 28 may include a comparator as a voltage monitoring section for monitoring whether the power supply voltage is an upper limit voltage or less so that a signal (H or L) corresponding to a result of comparison between the power supply voltage and the upper limit voltage is outputted from an output terminal of the comparator.

With regard to the content of the fail-safe process, the fail-safe process only needs to be a process for controlling the rotary electric machine 21 on a safe side, and the fail-safe process is not limited to the process of interrupting the electric current to the rotary electric machine 21. For example, the fail-safe process may restrict an output of the rotary electric machine 21 by controlling the electric current to the rotary electric machine 21 in a specific electric current pattern. Furthermore, when a rise in power supply voltage is detected as the abnormality in power supply voltage, as the fail-safe process, control may be performed to cause the rotary electric machine 21 to be in a phase short-circuit state (a three-phase short-circuit, in the present embodiment), so that a short-circuit current flows through the rotary electric machine.

As the fail-safe process, a process unrelated to the electric current control may be performed. For example, the present disclosure may be applied to a configuration in which the fail-safe process provides notification to the driver so that the rotary electric machine 21 is on a safe side. In this case, the operation check process for the abnormality diagnosis function is performed, for example, by determining whether, when a false abnormality signal has been outputted due to a virtual abnormality in power supply voltage, an output has been made from a meter ECU to a display section of a dashboard.

In the above embodiments, the operation check process for the abnormality diagnosis function is separately performed for the field side and the stator side to prevent torque from being generated by the rotary electric machine 21. However, as the control of the electric current for operation check, the electric current may be controlled so that a q-axis current is zero to prevent torque from being generated by the rotary electric machine 21. Furthermore, the operation check of the abnormality diagnosis function may be performed when the vehicle is stationary. Specifically, the operation check of the abnormality diagnosis function may be performed while, in the vehicle, a clutch is released so that power transmission is interrupted, or a shift range is a P range and a parking brake is applied.

In the above embodiments, the operation check process for the abnormality diagnosis function is performed when the system is shut down. However, the operation check process may be performed when the system is started. Alternatively, the operation check process may be performed when a superior command for generated torque (e.g., a torque command from the engine ECU 40) issued to the rotary electric machine 21 is zero. The operation check of the abnormality diagnosis function performed when the system is started or when the superior command for torque issued to the rotary electric machine 21 is zero is preferable in that, as in when the system is shut down, the operation check of the abnormality diagnosis function can be performed without inhibiting the power generation function and the power running function of the rotary electric machine 21.

When it is determined, by the operation check of the abnormality diagnosis function, that an abnormality is present, the result of the determination may be stored in a nonvolatile memory, and after the system is started next and subsequent times, the result of the determination may be maintained to continuously perform the interruption of the electric current to the rotary electric machine 21 and/or the notification to the user.

In the second embodiment, a false abnormality signal is generated by the rotary electric machine ECU 24, and a command is issued directly from the rotary electric machine ECU 24 or via the ASIC 28 to determine whether the fail-safe process operates normally. Alternatively, the engine ECU 40 may generate a false abnormality signal and output the false abnormality signal to the rotary electric machine ECU 24 or the ASIC 28 to determine whether the fail-safe process for controlling the rotary electric machine 21 on a safe side operates normally. Alternatively, the battery ECU 37 may generate a false abnormality signal and output the false abnormality signal to the rotary electric machine ECU 24 or the ASIC 28 to determine whether the fail-safe process for controlling the rotary electric machine 21 on a safe side operates normally.

The operation check process for the abnormality diagnosis function is preferably performed by using electric power supplied from the battery unit U. In this case, before the operation check process is started, it may be determined whether a power supply state of the battery unit U is a state where electric power necessary for the operation check of the abnormality diagnosis function can be supplied, and on condition that the power supply state of the battery unit U is the state where the electric power can be supplied, the operation check process for the abnormality diagnosis function may be performed.

In the above embodiments, the ASIC 28 is provided as a separate component from the rotary electric machine ECU 24. However, the rotary electric machine ECU 24 may have the function of the ASIC 28.

In the system including the lead storage battery 11 (first power storage section) and the lithium ion storage battery 12 (second power storage section) as the storage batteries connected in parallel to the rotary electric machine 21, the switch 31 (first switch) and the switch 32 (second switch) are provided as illustrated in FIG. 1. The switch 31 is provided in the electrical path between the first power storage section and the rotary electric machine 21 and electrically connects or disconnects the first power storage section and the rotary electric machine 21. The switch 32 is provided in the electrical path between the second power storage section and the rotary electric machine 21 and electrically connects or disconnects the second power storage section and the rotary electric machine 21. While the operation check section 24D is performing an operation check of the fail-safe function, the first power storage section supplies electric power to an electrical load that is driven during the operation check. Furthermore, the operation check section 24D may perform a power supply state switching process in which an operation check is performed while the first power storage section and the rotary electric machine 21 are electrically disconnected by opening the switch 31 and the second power storage section and the rotary electric machine 21 are electrically connected by closing the switch 32. Specifically, during the operation check of the fail-safe function, the second power storage section and the rotary electric machine 21 are disconnected from the first power storage section, and electric power is supplied from the second power storage section to the rotary electric machine 21. In this case, during the operation check of the fail-safe function, electric power is supplied from the first power storage section to the electrical load that is driven during the operation check, and thus, the electrical load can be stably driven. Furthermore, the operation check of the fail-safe function can also be performed in a stable electric power state. Thus, the operation check process can be properly performed.

Figure 9:
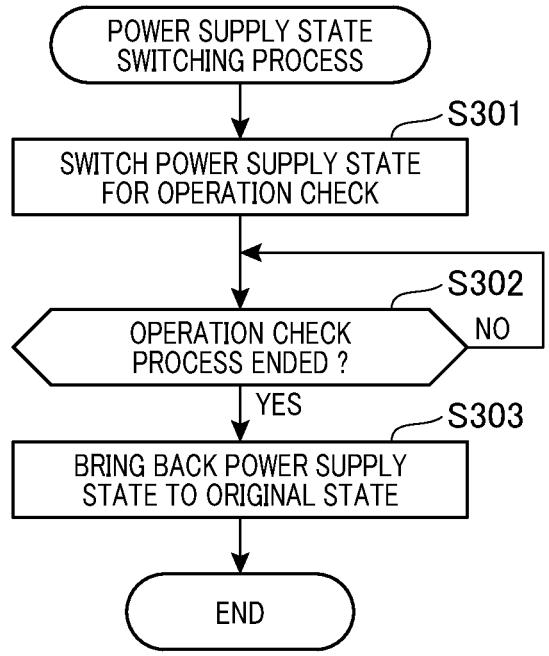
FIG. 9 is a flow chart showing a procedure of a power supply state switching process.

FIG. 9 is a flow chart showing a procedure of the power supply state switching process. In FIG. 9, in step S301, a power supply state of the system is switched for the operation check of the fail-safe function process. In the system in FIG. 1, the switch 31 and the switch 36 are opened, and the switch 32 is closed. In subsequent step S302, it is determined whether the operation check of the fail-safe function process has ended. In this step, when the operation check process has not ended, the power supply state at this point is maintained. When the operation check process has ended, the present process proceeds to step S303, and the power supply state is brought back to the original state. In the case where the operation check process is performed when the system is shut down, the switches 31, 32, and 36 are all opened.

In the configuration in FIG. 1, the electrical load 14, which is the constant voltage requiring load, is connected to the output terminal P1 side of the battery unit U, i.e., the lead storage battery 11 side, and the electrical load 15, which is a common load, is connected to the output terminal P2 side of the battery unit U, i.e., the rotary electric machine unit 16 side. However, this configuration may be modified. For example, the electrical load 15 (common load) may be connected to the output terminal P1 side of the battery unit U, and the electrical load 14 (constant voltage requiring load) may be connected to the output terminal P2 side of the battery unit U.

In the above embodiments, the operation check of the abnormality diagnosis function is performed for both of the field side and the stator side. However, the operation check of the abnormality diagnosis function may be performed for only one of the field side and the stator side. Furthermore, in the second embodiment, only one or more of the first to fifth processes may be performed.

The second embodiment performs the process of checking, on the basis of the false abnormality signal generated using the voltage switching circuit 51, whether the fail-safe function operates for a voltage drop abnormality, and the process of checking, directly by the rotary electric machine ECU 24 or via the ASIC 28 on the basis of the false abnormality signal generated by the abnormality signal generation section 24E of the rotary electric machine ECU 24, whether the fail-safe function operates. However, only the latter process may be performed.

In the above embodiments, while the operation of the rotary electric machine 21 is stopped, the operation check of the fail-safe function based on the false abnormality signal is performed. However, the operation check may be performed while the rotary electric machine 21 is operating. In this case, the operation check is preferably performed while power transmission of the vehicle is interrupted or while the shift range is the P range and the parking brake is operated.

In the above embodiments, the lead storage battery 11 is provided as the first power storage section, and the lithium ion storage battery 12 is provided as the second power storage section. However, this configuration may be modified. As the second power storage section, a high-density storage battery other than the lithium ion storage battery 12, for example, a nickel-hydrogen battery may be used. Furthermore, a capacitor may be used as at least one of the power storage sections.

In the above embodiments, the case where the present disclosure is applied to the motor including the winding field rotor has been described. However, the present disclosure may be applied to a motor including a permanent magnet rotor.

In the above embodiments, the case where a three-phase AC motor is used as the rotary electric machine 21 has been described. However, for example, the present disclosure may be applied to a motor other than the three-phase AC motor, such as a six-phase AC motor.

In the above embodiments, the rotary electric machine that performs both of the power generation operation and the power running operation has been described. However, the present disclosure may be applied to a rotary electric machine that performs only one of the power generation operation and the power running operation.

A power supply system to which the present disclosure is applied may be used for applications other than vehicles, for example, for ships, aircrafts, robots, and the like.

The above components are conceptional and are not limited to the above embodiments. For example, it is possible to achieve functions of a single component by distributing the functions among a plurality of components or achieve functions of a plurality of components by a single component.

The present disclosure has been described on the basis of the embodiments, but it is understood that the present disclosure is not limited to the embodiments or the configurations. The present disclosure includes various modified examples and modifications within an equivalent range. In addition, a category or range of thought of the present disclosure includes various combinations or forms and other combinations or forms including only one element, one or more elements, or one or less elements of those.

The invention claimed is:

1. An abnormality diagnosis apparatus for performing an abnormality diagnosis of a system equipped with a rotary electric machine, the abnormality diagnosis apparatus comprising:
    an abnormality detection section that detects an abnormality of the system;
    a fail-safe processing section that, when the abnormality detection section detects an abnormality, performs a fail-safe process for controlling the rotary electric machine on a safe side;
    an abnormality signal generation section that, when the system is in a normal state, generates a false abnormality signal assuming that an abnormality that requires the fail-safe process has occurred;
    an operation check section that performs, on the basis of the false abnormality signal generated by the abnormality signal generation section, an operation check for checking whether the fail-safe process operates normally; and
    a switching circuit, wherein
    the fail-safe processing section performs the fail-safe process on the basis of a result of comparison between a voltage of a power storage section connected to the rotary electric machine and a threshold voltage,
    the switching circuit switches a voltage to be compared with the threshold voltage from the voltage of the power storage section to a voltage lower or higher than the threshold voltage, and
    the abnormality signal generation section generates the false abnormality signal by causing the switching circuit to switch the voltage to be compared with the threshold voltage from the voltage of the power storage section to a voltage lower or higher than the threshold voltage.

2. The abnormality diagnosis apparatus according to claim 1, wherein
    while operation of the rotary electric machine is stopped, the operation check section performs the operation check on the basis of the false abnormality signal.

3. The abnormality diagnosis apparatus according to claim 1, wherein
    the abnormality signal generation section generates, as the false abnormality signal, an abnormality signal containing abnormality information different from an actual result of detection performed by the abnormality detection section.

4. The abnormality diagnosis apparatus according to claim 1, wherein
    the operation check section performs the operation check by controlling an electric current so that no torque is generated by the rotary electric machine.

5. The abnormality diagnosis apparatus according to claim 1, wherein
    when the operation check section determines that the fail-safe process does not operate normally, power supply to the rotary electric machine is interrupted.

6. The abnormality diagnosis apparatus according to claim 1, further comprising:
    a first power storage section and a second power storage section that are connected in parallel to the rotary electric machine;
    a first switch that is provided in an electrical path between the first power storage section and the rotary electric machine and electrically connects or disconnects the first power storage section and the rotary electric machine; and a second switch that is provided in an electrical path between the second power storage section and the rotary electric machine and electrically connects or disconnects the second power storage section and the rotary electric machine, wherein while the operation check section is performing an operation check of the fail-safe process, electric power is supplied from the first power storage section to an electrical load that is driven during the operation check, and the operation check section performs the operation check while the first power storage section is electrically disconnected from the rotary electric machine by opening the first switch, and the second power storage section is electrically connected to the rotary electric machine by closing the second switch.

7. The abnormality diagnosis apparatus according to claim 1, wherein the abnormality diagnosis apparatus is applied to a system equipped with an electromechanical rotary electric machine unit including the rotary electric machine and a control unit that controls operation of the rotary electric machine.

8. An abnormality diagnosis apparatus for performing an abnormality diagnosis of a system equipped with a rotary electric machine, the abnormality diagnosis apparatus comprising:

an abnormality detection section that detects an abnormality of the system;

a fail-safe processing section that, when the abnormality detection section detects an abnormality, performs a fail-safe process for controlling the rotary electric machine on a safe side;

an abnormality signal generation section that, when the system is in a normal state, generates a false abnormality signal assuming that an abnormality that requires the fail-safe process has occurred;

an operation check section that performs, on the basis of the false abnormality signal generated by the abnormality signal generation section, an operation check for checking whether the fail-safe process operates normally;

a first power storage section and a second power storage section that are connected in parallel to the rotary electric machine;

a first switch that is provided in an electrical path between the first power storage section and the rotary electric machine and electrically connects or disconnects the first power storage section and the rotary electric machine; and a second switch that is provided in an electrical path between the second power storage section and the rotary electric machine and electrically connects or disconnects the second power storage section and the rotary electric machine, wherein while the operation check section is performing an operation check of the fail-safe process, electric power is supplied from the first power storage section to an electrical load that is driven during the operation check, and the operation check section performs the operation check while the first power storage section is electrically disconnected from the rotary electric machine by opening the first switch, and the second power storage section is electrically connected to the rotary electric machine by closing the second switch.

* * * * *